(12) United States Patent
Mandavilli et al.

(10) Patent No.: US 7,948,916 B2
(45) Date of Patent: May 24, 2011

(54) METHOD AND APPARATUS FOR DISCOVERING TOPOLOGY INFORMATION IN A NETWORK

(75) Inventors: Swamy J. Mandavilli, Fort Collins, CO (US); Zhi Qlang Wang, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1494 days.

(21) Appl. No.: 10/354,960

(22) Filed: Jan. 31, 2003

(65) Prior Publication Data

US 2004/0151202 A1 Aug. 5, 2004

(51) Int. Cl.
*H04L 12/28* (2006.01)
*G06F 15/177* (2006.01)

(52) U.S. Cl. ........................................ 370/254; 709/220
(58) Field of Classification Search ........................ None
See application file for complete search history.

(56) References Cited

U.S. PATENT DOCUMENTS

| | | | | |
|---|---|---|---|---|
| 5,987,520 A * | 11/1999 | Libby et al. | | 709/238 |
| 6,009,103 A * | 12/1999 | Woundy | | 370/401 |
| 6,038,233 A | 3/2000 | Hamamoto et al. | | |
| 6,118,784 A | 9/2000 | Tsuchiya et al. | | |
| 6,172,986 B1 | 1/2001 | Watanuki et al. | | |
| 6,272,572 B1 * | 8/2001 | Backhaus et al. | | 710/100 |
| 6,522,632 B1 * | 2/2003 | Waters et al. | | 370/254 |
| 6,581,106 B1 * | 6/2003 | Crescenzi et al. | | 709/242 |
| 6,665,713 B1 | 12/2003 | Hada et al. | | |
| 6,697,338 B1 * | 2/2004 | Breitbart et al. | | 370/254 |
| 6,917,977 B2 * | 7/2005 | White et al. | | 709/226 |
| 6,954,459 B1 * | 10/2005 | Vaidhyanathan et al. | | 370/392 |
| 7,031,288 B2 * | 4/2006 | Ogier | | 370/338 |
| 7,085,270 B2 * | 8/2006 | Inouchi et al. | | 370/392 |
| 7,095,738 B1 * | 8/2006 | Desanti | | 370/389 |
| 7,111,071 B1 * | 9/2006 | Hooper | | 709/238 |
| 7,142,541 B2 * | 11/2006 | Kumar et al. | | 370/392 |
| 7,293,106 B2 * | 11/2007 | Natarajan et al. | | 709/238 |
| 2002/0122394 A1 * | 9/2002 | Whitmore et al. | | 370/328 |
| 2003/0140168 A1 * | 7/2003 | Peshkin et al. | | 709/245 |
| 2003/0179742 A1 * | 9/2003 | Ogier et al. | | 370/351 |
| 2003/0217175 A1 * | 11/2003 | Mathew et al. | | 709/238 |
| 2004/0057440 A1 * | 3/2004 | Thubert et al. | | 370/401 |
| 2005/0047334 A1 * | 3/2005 | Paul et al. | | 370/229 |
| 2006/0023676 A1 * | 2/2006 | Whitmore et al. | | 370/338 |

FOREIGN PATENT DOCUMENTS

EP 1 009 130 6/2000

OTHER PUBLICATIONS

IETF Document RFC (2465), "Management Information Base for IP Version 6: Textual Conventions and General Group", Dec. 1998, pp. 1-33.

IETF Document RFC (1981), "Path MTU Discovery for IP Version 6", Aug. 1996, pp. 1-13.

(Continued)

*Primary Examiner* — Ricky Ngo
*Assistant Examiner* — Clemence Han

(57) ABSTRACT

A topology or connectivity of a computer network is discovered by identifying interface addresses in an address table of a node in the network, comparing prefixes of the interface addresses with prefixes in an address prefix table of the node, and associating subnets in the network with interfaces corresponding to the interface addresses, based on the comparing.

15 Claims, 3 Drawing Sheets

OTHER PUBLICATIONS

IETF Document RFC (2463), "Internet Control Message Protocol (ICMPv6) for the Internet Protocol Version 6 (IPv6) Specification", Dec. 1998, pp. 1-16.

IETF Document RFC (2462), "IPv6 Stateless Address Autoconfiguration", Dec. 1998, pp. 1-22.

IETF Document RFC (2461), Neighbor Discovery for IP Version 6 (IPv6), Dec. 1998, pp. 1-81.

IETF Document RFC (2460), "Internet Protocol, Version 6 (IPv6) Specification", Dec. 1998, pp. 1-34.

* cited by examiner

METHOD AND APPARATUS FOR DISCOVERING TOPOLOGY INFORMATION IN A NETWORK

BACKGROUND

In electronic data networks, there is often a need to discern or discover the topology of the networks, for example links between nodes in the networks formed via interfaces of the nodes and subnets between the nodes.

U.S. Pat. No. 6,172,986 discloses a mobile node moving from a first IP (Internet Protocol) network having a first kind of IP to a second IP network having a second kind of IP, in a network system. When the mobile node communicates a message with other nodes on the first network after its movement, a header for the movement containing both home and foreign addresses in the first kind of IP is added to a header containing home and foreign addresses in the second kind of IP, and the headers are added to the message.

U.S. Pat. No. 6,188,784 discloses an apparatus for handling communications from both IPv4 and IPv6 terminals.

U.S. Pat. No. 6,038,233 discloses a translator for coupling a first network such as an internet protocol version 4 (IPv4) and a second network such as an internet protocol version 6 (IPv6) having different addressing architectures for IP addresses.

SUMMARY

In an exemplary method consistent with the invention, a topology of a computer network is discovered by identifying interface addresses in an address table of a node in the network, comparing prefixes of the interface addresses with prefixes in an address prefix table of the node, and associating subnets in the network with interfaces corresponding to the interface addresses, based on the comparing. An exemplary machine readable medium includes software for causing a computing device to perform the exemplary method. An exemplary system for discovering a topology of a computer network includes an agent configured to identify interface addresses in an address table of a node in the network, compare prefixes of the interface addresses with prefixes in an address prefix table of the node, and associate subnets in the network with interfaces corresponding to the interface addresses, based on the comparison. An exemplary system for discovering topology information in a computer network includes means for identifying interface addresses in an address table of a node in the network, means for comparing prefixes of the interface addresses with prefixes in an address prefix table of the node, and means for associating subnets in the network with interfaces corresponding to the interface addresses, based on the comparing.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE EXEMPLARY EMBODIMENTS

Figure 1:
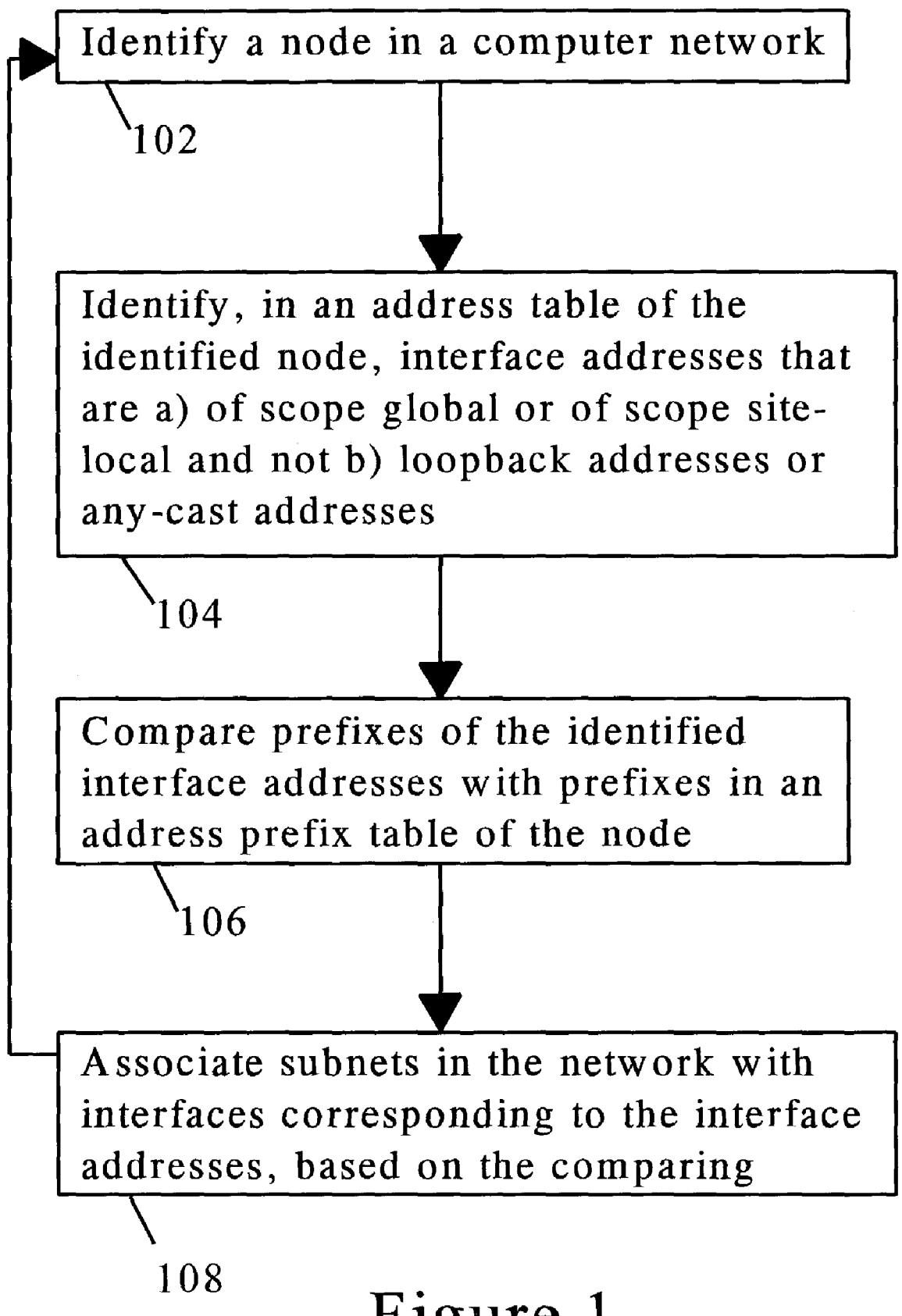
FIG. 1 illustrates an exemplary method in accordance with an embodiment of the invention.

FIG. 1 illustrates an exemplary method, which can, for example, be used in an IPv6 (Internet Protocol version 6) network, for example to discover network topology or connectivity at Layer-III (i.e., the Network Layer of the ISO model). Layers 1-7 are defined in accordance with the International Organization for Standardization (ISO) model. A discussion of computer network protocols and layers of the ISO model is discussed, for example, in "Interconnections, Second Edition," by Radia Perlman (Addison-Wesley, 2000), the disclosure of which is incorporated herein by reference in its entirety. As used herein, a "node" is a network junction or connection point. For example, a node can be a server connected to a LAN (Local Area Network), a router, a personal computer connected to a LAN, and so forth. As used herein, a "subnet" is a portion of a network, which can be a physically independent network segment, which shares a network address with other portions of the network and is distinguished by a subnet number or identifier, for example a prefix of an IPv6 (Internet Protocol version 6) address.

In a first block 102, a node is identified in a computer network. In a next block 104, interface addresses in an address table, for example IP addresses assigned to an interface of a node, are identified. The identified addresses can be a) of scope global or of scope site-local, and not b) loopback addresses or any-cast addresses. In a next block 106, prefixes of the identified addresses are compared with prefixes in an address prefix table, of the node. In a next block 108, subnets in the network are associated with interfaces corresponding to the interface addresses, based on the comparing in block 106.

Figure 2:
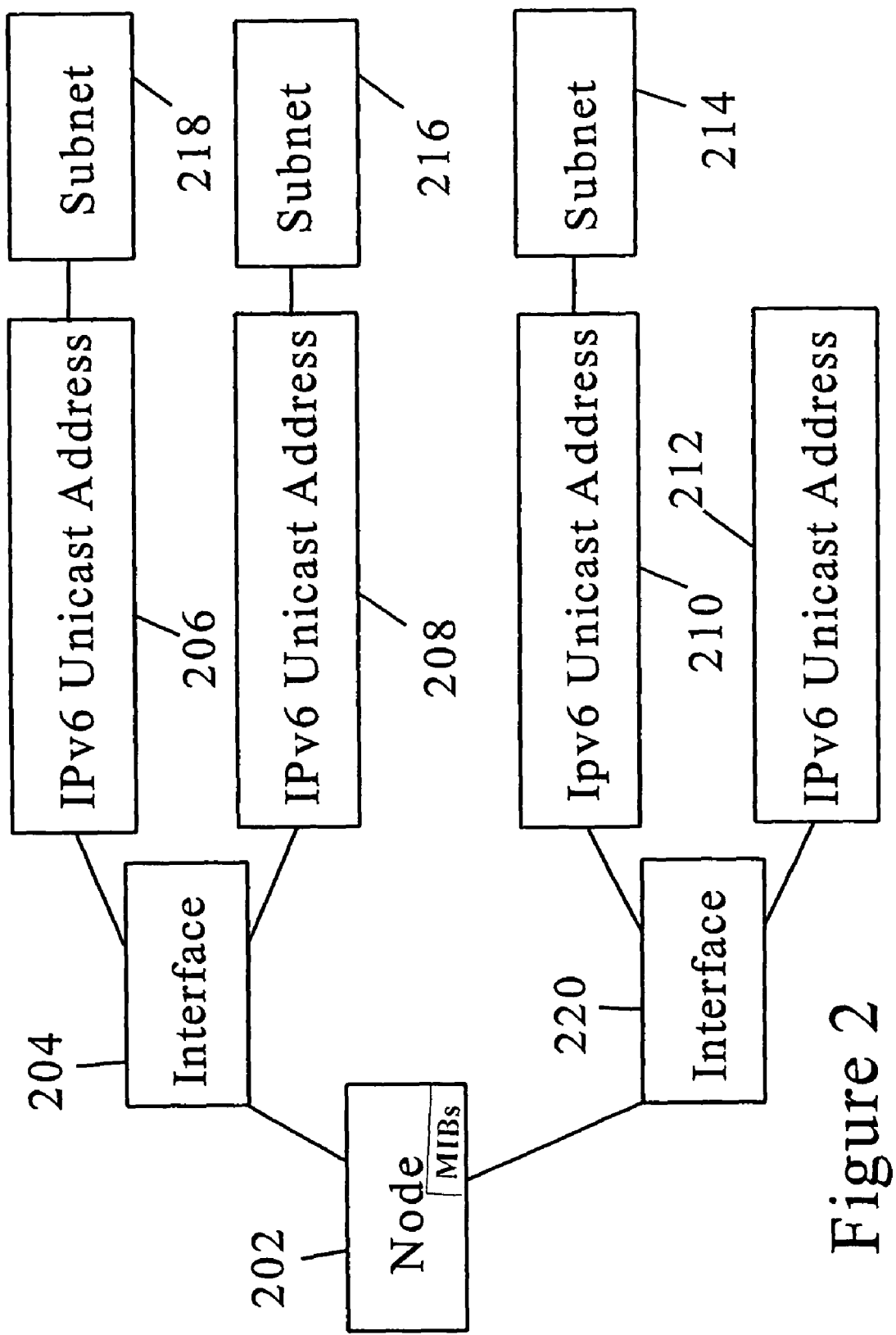
FIG. 2 illustrates exemplary relationships between a node and subnets in a network.

FIG. 2 illustrates exemplary relationships between a node and subnets in a network, including interfaces of the node and IPv6 unicast addresses assigned to the interfaces and associated with subnets. In particular, the node 202 has two interfaces 204, 220. The interface 204 has IPv6 unicast addresses 206, 208 assigned to it (i.e., pointing or leading to it), and the interface 220 has IPv6 unicast addresses 210, 212 assigned to it. As shown, a node can have multiple interfaces, and each interface can have multiple addresses assigned to it, for example IPv6 unicast addresses. Each IPv6 unicast address has zero or one subnet associated with it. For example, the addresses 206, 208, 210 are associated respectively with the subnets 218, 216, 214, while the address 212 is not associated with a subnet. Each subnet has one prefix associated with it. An IPv6 unicast address is associated with a subnet by having a prefix that matches the prefix associated with a subnet. Thus, the prefixes of the addresses 206, 208, 210 respectively match the prefixes associated with the subnets 218, 216, 214. For example, where an address is 128 bits long and the prefix is 64 bits long, the addresses (presented in hexadecimal form) 3FFE:0501:0023:000A:0000:0000:0000:0000, 3FFE:0501:0023:000A:00A9:03AB:0007:0023, and 3FFE:0501:0023:000A:FE10:A001:0031:AE1F all have the same prefix "3FFE05010023000A".

Figure 3:
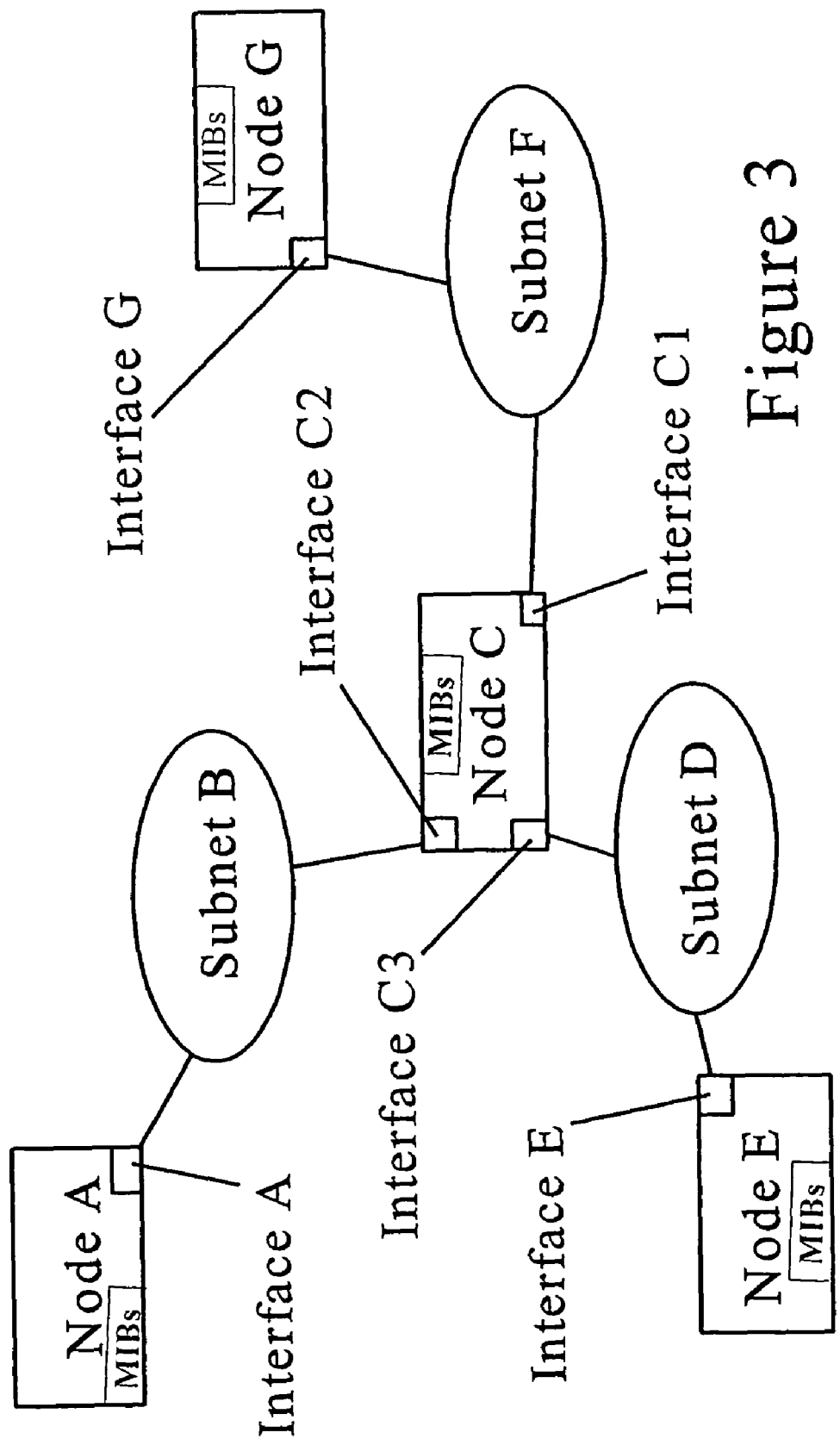
FIG. 3 illustrates exemplary relationships between nodes and subnets in a network.

FIG. 3 illustrates how physical nodes A, E, C, G in a network can be logically linked by subnets B, D, F. FIG. 3 shows subnet B located positioned between nodes A, C, subnet D between nodes E, C, and subnet F between nodes G, C. An address assigned to interface A in node A, would have the same prefix as the prefix associated with the subnet B, the address assigned to interface E in node E would have the same prefix as the prefix associated with the subnet D, and the address assigned to interface G in node G would have the same prefix as the prefix associated with the subnet F. In node C, the interface C2 would have the same prefix as the prefix associated with subnet B, the interface C3 would have the same prefix as the prefix associated with subnet D, and the interface C1 would have the same prefix as the prefix associated with subnet F. Of course, other configurations are possible. For example, the node C can have a single interface with three addresses assigned to it, where each of the three addresses has a different prefix matching prefix associated with one of the subnets B, D, F. The addresses assigned to the interfaces and the subnets, are logical entities.

The method shown in FIG. 1 can be implemented by processing nodes having Management Information Bases (MIBs) defined in IPv6, such as an interface MIB table, an address MIB table, an address prefix MIB table, a net-to-media MIB table, and a routing MIB table. See, for example, IETF (Internet Engineering Task Force) IPv6 document RFC (Request for Comments) 2465, dated December 1998.

The interface MIB table can include a listing of interfaces of a node, as well as information about the interfaces, for example a status indication of the interface (e.g., operational/non-operational), identifiers referring to the interface (including, e.g., an index), and so forth.

The address MIB table can include a listing address values, and an indication for each address value, of an interface on which the address is defined, or in other words an indication of the interface the address is assigned to. The indication can for example be an interface index. The address MIB table can also include a prefix length for each address value.

The address prefix MIB table can include a listing of prefixes. In an exemplary embodiment, the address prefix MIB table associates each prefix with only one subnet, and associates each subnet with only one prefix. The interface MIB table, the address MIB table, and the address prefix MIB table can be used to obtain topology information.

The net-to-media MIB table can include information about neighbors of a node, for example neighbor address and interface index information, and can include information that translates or correlates IP (Internet Protocol) addresses to MAC (Medium Access Layer) addresses.

The routing MIB table can include information about next hop address(es) from the node, including address and interface index information. The net-to-media MIB table and the routing MIB table can be used to help identify new nodes for processing or investigation.

Exemplary pseudocode for implementing the algorithm of FIG. 1:
1. Create a "Node object" object
2. Get Interface MIB Table and create one "Interface" object for each row in the Interface MIB Table (relating to the Node object created in step 1)
   a) Ignore entries that correspond to the "virtual interface" for the Loopback address This can be done by comparing the Interface Identifier with "::1"
3. For each entry in the Address-Prefix MIB Table, create one Subnet object and include information from the Address-Prefix MIB Table regarding the Subnet, in the Subnet object
4. Get Address MIB Table
5. For each entry in the Address MIB Table:
   A) Ignore Loopback address (::1)
   B) If the corresponding Interface has no other Address, the Interface will be ignored (e.g., later in a post processing procedure)
   C) Ignore Any-Cast addresses (using the Any-Cast flag in the MIB)
   D) Create an object of type "Address"
   E) Include DNS (Domain Name System) name obtained through DNS
   F) If this Address is of Scope Global OR Site-Local: Discern Prefix value using the Prefix Length and Address Value from the Address MIB Table, create a Subnet object if not already created (and associate this Address or Address object with the Subnet object)
      i) To obtain extra attributes for this Subnet, query the Address-Prefix MIB Table with this Prefix value
         a) If an entry is found in the Address-Prefix MIB Table, use those attributes for the newly created Subnet object.
         b) If no entry found in the Address-Prefix MIB Table, all the other attributes of the Prefix-Group object would be NULL
   G) Obtain the Interface Index (e.g. from the Address MIB Table) corresponding to this Address and associate this Address or Address object to the Interface object created in Step-2
6. Get NetToMedia MIB Table and Route MIB Table (Nexthop column) and make an object of type "Node". For each NetToMedia Neighbor and NextHopRouter
   a) Obtain DNS names and store them in the object
   b) For each Address with the Scope of Site-Local OR Global: include reference to the corresponding "Subnet object" by matching the longest Prefix created for this Interface
   c) repeat 1-6 for each new node Regarding step 1 of the pseudocode, a Node can be known, for example, through a user's indication or seed entry, or via a neighbor node. In step 6, we are "discovering" new nodes. When a node is found, we are learning an address for it also (from the NetToMedia or Route MIB Table). When we run the whole pseudocode (steps 1-6) again for that node, ideally we can obtain all the data regarding that node. However, there can be corner cases (e.g., no SNMP (Simple Network Management Protocol) access) where the pseudocode might not successfully operate on such a node. To take care of this, 6b attempts to construct this node, including node-to-interface relationship, interface-to-address relationship and address-to-subnet relationship. In an exemplary embodiment, step 5F is not performed for addresses of scope link local.

A Node Object can include a hostname of the node, and a description of the node. An Interface Object can include an interface index, and a description of the interface. A Subnet Object can include a Prefix, a Scope, and a Subnet-name. The Address Object can include Scope, a DNS name, an address value, and a prefix length of the Address. An Interface index can also be included as a property of the Address Object. All of the objects can include a status indication, for example whether the corresponding address, node, interface, or subnet is operational, and so forth.

Subnets/prefixes associated with an interface can be determined, for example after the pseudocode above has been run, by i) finding addresses pointing to the interface (where the addresses are scope Global or scope Site Local but not "Loopback" or "Any-Cast"), for example by querying or accessing the interface's Interface Object, then ii) accessing the Address Objects for the addresses to obtain address values and prefix lengths and thereby prefixes, and then iii) accessing Subnet Objects using the prefixes, to obtain information regarding subnets. Those skilled in the art will also recognize other techniques for extracting topology or connectivity information from the data and/or data structures/objects described herein.

In accordance with exemplary embodiments, each Subnet has a unique prefix associated with it. To associate an address to a subnet, for example an address of an interface belonging to a node, the prefix of the address needs to be known. Associating an address (discovered for example from a Net-To-Media MIB table or a Routing MIB table for the node) to its subnet can be done by a) identifying the interface that corresponds to the address (for example, via an Interface-Index available in MIB tables of the node, for example an interface MIB table and an address MIB table), b) obtaining all subnet prefixes associated with the interface (for example, from an address prefix MIB table of the node), and c) matching a prefix of the address to a prefix of one of the subnets. The matching can be done by comparing bits of a subnet prefix with bits of the address being processed/associated. If more than one subnet matches the address, then the subnet having the longest prefix (most number of bits in the prefix) can be chosen.

Those skilled in the art will recognize that associations between objects described above in the pseudocode, can be realized via a variety of techniques and/or mechanisms. Example mechanisms include, but are not limited to, a) objects pointing to each other, for example using object identifiers, b) relationship table(s) indicating relationships between objects and/or between data in different objects, c) implicit links or relationships indicated by shared information, and so forth.

The methods, logics, techniques and pseudocode sequences can be implemented in a variety of programming styles (for example Structured Programming, Object-Oriented Programming, and so forth) and in a variety of different programming languages (for example Java, C, C++, C#, Pascal, Ada, and so forth).

Those skilled in the art will recognize that although the pseudocode described herein explicitly provides for the IPv6 IETF (Internet Engineering Task Force) standard, the pseudocode and principles therein can be easily adapted to other standards and situations. For example, although reference is made to the IPv6 standard, exemplary embodiments apply generally to topology data merging, and can be applied in various situations with respect to various protocol standards, network arrangements, and so forth.

Those skilled in the art will be familiar with the IPv6 (Internet Protocol version 6) IETF (Internet Engineering Task Force) standard. In particular, the following IETF documents relating to the IPv6 IETF standard are hereby incorporated by reference in their entirety: RFC 2460, December 1998; RFC 2461, December 1998; RFC 2462, December 1998; RFC 2463, December 1998; RFC 2465, December 1998; and RFC 1981, August 1996).

Those skilled in the art will appreciate that the elements and methods or processes described herein can be implemented using a microprocessor, computer, or any other computing device, and can be implemented in hardware and/or software, in a single physical location or in distributed fashion among various locations or host computing platforms. For example, an agent or agents can perform the actions shown in FIG. 1 and the actions described in the pseudocode above. The agents can be implemented in hardware and/or software at any desired or appropriate location, using a microprocessor, computer, or any other computing device, and can be implemented in hardware and/or software, in a single physical location or in distributed fashion among various locations or host computing platforms. Those skilled in the art will also appreciate that software, including instructions for causing a computing device or system to perform the methods or processes, can be stored on a machine-readable medium.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

The invention claimed is:

1. Method for discovering topology information in a computer network, comprising:
   identifying interface addresses in an address table of a node in the network by ignoring all loopback addresses and all any-cast addresses;
   comparing prefixes of the interface addresses with prefixes in an address prefix table of the node;
   associating subnets in the network with interfaces corresponding to the interface addresses, based on the comparison;
   identifying an other node with a retrieved address from reading a net-to-media table or routing table using the identified interface address of an interface of the node as an index to the net-to media table or the routing table,
      wherein the net-to-media table includes information about nodes neighboring the node including neighboring address and interface index information, and
      wherein the routing table includes information about one or more next hop addresses from the node including address and interface index information;
   repeating the identifying interface addresses, the comparing prefixes, and associating subnets with the other node; and
   generating a topology from the association of the subnets in the network with the interfaces.

2. The method of claim 1, wherein the identified interface addresses are of scope global or of scope site-local but not of scope link local.

3. The method of claim 1, wherein the address table and the address prefix table are IPv6 management information bases.

4. The method of claim 1, wherein two or more of the identified interface addresses are assigned to one interface in the computer network.

5. The method of claim 1,
   wherein the computer network includes a plurality of nodes and one or more subnets that are linked with each other,
   wherein each subnet is a segment of the network and shares a network address with other subnets of the network and each subnet is distinguished by a prefix portion of an address data that is unique within the computer network,
   wherein each node includes one or more interfaces, each interface being associated with one or more interface addresses, and
   wherein each interface address is associated with zero or one subnet.

6. The method of claim 1,
   wherein the address table includes a listing of one or more address values associated with each interface of the node, and
   wherein the address prefix table includes a listing of prefixes, wherein each prefix is associated with only one subnet and each subnet is associated with only one prefix.

7. A system for discovering a topology of a computer network, comprising:

an agent configured to identify interface addresses in an address table of a node in the network by ignoring all loopback addresses and all any-cast addresses, compare prefixes of the interface addresses with prefixes in an address prefix table of the node, associate subnets in the network with interfaces corresponding to the interface addresses, based on the comparison, identify an other node with a retrieved address from reading a net-to-media table or routing table using the identified interface address of an interface of the node as an index to the net-to media table or the routing table,
wherein the net-to-media table includes information about nodes neighboring the node including neighboring address and interface index information, and
wherein the routing table includes information about one or more next hop addresses from the node including address and interface index information;

repeat the identify interface addresses, the compare prefixes, and associate subnets with the other node; and generate a topology from the associated subnets with the interfaces.

8. A system for discovering topology information in a computer network, comprising:

means for identifying interface addresses in an address table of a node in the network by ignoring all loopback addresses and all any-cast addresses;

means for comparing prefixes of the interface addresses with prefixes in an address prefix table of the node;

means for associating subnets in the network with interfaces corresponding to the interface addresses, based on the comparison;

means for identifying an other node with a retrieved address from reading a net-to-media table or routing table using the identified interface address of an interface of the node as an index to the net-to media table or the routing table,
wherein the net-to-media table includes information about nodes neighboring the node including neighboring address and interface index information, and
wherein the routing table includes information about one or more next hop addresses from the node including address and interface index information;

means for repeating the identifying interface addresses, the comparing prefixes, and associating subnets with the other node; and means for generating a topology from the association of the subnets in the network with the interfaces.

9. The system of claim 8, wherein the identified interface addresses are of scope global or of scope site-local but not of scope link local.

10. The system of claim 9, wherein the address table and the address prefix table are IPv6 management information bases.

11. The system of claim 8, wherein two or more of the identified interface addresses are assigned to one interface in the computer network.

12. A non-transitory machine readable medium storing software for causing a computing device to perform a method comprising:

identifying interface addresses in an address table of a node in the network by ignoring all loopback addresses and all any-cast addresses;

comparing prefixes of the interface addresses with prefixes in an address prefix table of the node;

associating subnets in the network with interfaces corresponding to the interface addresses, based on the comparison;

identifying an other node with a retrieved address from reading a net-to-media table or routing table using the identified interface address of an interface of the node as an index to the net-to-media table or the routing table,
wherein the net-to-media table includes information about nodes neighboring the node including neighboring address and interface index information, and
wherein the routing table includes information about one or more next hop addresses from the node including address and interface index information;

repeating the identifying interface addresses, the comparing prefixes, and associating subnets with the other node; and generating a topology from the association of the subnets in the network with the interfaces.

13. The medium of claim 12, wherein the identified interface addresses are of scope global or of scope site-local but not of scope link local.

14. The medium of claim 12, wherein the address table and the address prefix table are IPv6 management information bases.

15. The medium of claim 12, wherein two or more of the identified interface addresses are assigned to one interface in the computer network.

* * * * *